United States Patent
Hanson et al.

(10) Patent No.: US 8,801,058 B2
(45) Date of Patent: Aug. 12, 2014

(54) ADJUSTABLE MODULAR AUTOMOTIVE GRILLE GUARD ASSEMBLY

(71) Applicant: Overkill Motorsports Inc., Dallas, TX (US)

(72) Inventors: Mark E. Hanson, Providence Village, TX (US); Travis O. Kirkman, Dallas, TX (US)

(73) Assignee: Overkill Motorsports Inc., Dallas, TX (US)

( * ) Notice: Subject to any disclaimer, the term of this patent is extended or adjusted under 35 U.S.C. 154(b) by 0 days.

(21) Appl. No.: 13/745,220

(22) Filed: Jan. 18, 2013

(65) Prior Publication Data

US 2013/0187395 A1    Jul. 25, 2013

Related U.S. Application Data

(60) Provisional application No. 61/588,265, filed on Jan. 19, 2012.

(51) Int. Cl.
*B60R 19/52*    (2006.01)

(52) U.S. Cl.
USPC .......................................... 293/115; 180/68.6

(58) Field of Classification Search
USPC ........................................... 293/115; 18/68.6
See application file for complete search history.

(56) References Cited

U.S. PATENT DOCUMENTS

| | | | | |
|---|---|---|---|---|
| 5,326,142 A * | 7/1994 | Dodds et al. | ................... | 293/115 |
| 6,315,338 B1 * | 11/2001 | Schneider et al. | ............ | 293/115 |
| 7,306,271 B2 * | 12/2007 | Kang et al. | ..................... | 293/115 |
| 7,513,545 B2 * | 4/2009 | Joseph et al. | ................. | 293/115 |
| 2010/0283272 A1 * | 11/2010 | Schneider | ..................... | 293/115 |

* cited by examiner

*Primary Examiner* — Dennis H Pedder
(74) *Attorney, Agent, or Firm* — Gardere Wynne Sewell LLP

(57) ABSTRACT

An adjustable, modular grille guard assembly addresses deficiencies of both single-unit grille guard assemblies and conventional modular grille guard assemblies. The adjustable, modular grille guard assembly is stronger and more durable than both conventional modular grille guard assemblies and single-unit grille guard assemblies. Additionally, the adjustable, modular design allows the assembly to fit various vehicles, is conducive to aftermarket exterior modifications, is cost efficient for manufacturers and suppliers, does not require complete removal when work is performed on the front of the vehicle, and allows quick and easy removal/replacement of specific members. Additionally, due to its modular design, the grille guard assembly is cheaper and easier to ship than single-unit assemblies since it may be broken down to fit into smaller containers. The adjustable, modular grille guard assembly is adjustable, provides sufficient strength and durability due to its design and construction materials, and allows for selective replacement of damaged members.

22 Claims, 21 Drawing Sheets

ADJUSTABLE MODULAR AUTOMOTIVE GRILLE GUARD ASSEMBLY

CROSS REFERENCE TO RELATED APPLICATIONS

Pursuant to 35 U.S.C. §119(e), this application is entitled to the benefit of, and hereby incorporates by reference for all purposes, U.S. Provisional Patent Application Ser. No. 61/588,265, entitled "Adjustable Modular Automotive Grille Guard Assembly," filed Jan. 19, 2012 and naming Mark Hanson and Travis Kirkman as inventors.

BACKGROUND

1. Technical Field

The present invention relates generally to automotive grille guards and, more particularly, to an adjustable, modular automotive grille guard assembly.

2. Introduction

Grille guards are typically mounted on the front of a vehicle to protect the grille, or front portion of the vehicle, from damage that may occur, for example, from minor vehicle collisions or off-road travel. Various grille guard assemblies may include one or more brush guard members attached to a grille guard member, wherein the brush guard members are designed to further protect the headlights and other parts of the vehicle from damage. In order to provide sufficient strength, conventional grille guard assemblies are often comprised of steel tubing, wherein the tubing is welded together to form a single, continuous unit.

Single-unit grille guard assembly designs are subject to various disadvantages. For example, because the grille guard assembly is a single unit, each assembly is built in accordance with the specifications and/or dimensions of a specific vehicle. Thus, single-unit grille guard assemblies are not particularly conducive to vehicles with exterior aftermarket modifications. Also, in order to maintain a sufficient supply of single-unit grille guard assemblies, suppliers allocate sufficient resources (e.g., storage space) to stock inventory of grille guard assemblies for many different makes and models of vehicles. Another disadvantage of the single-unit grille guard assembly is that it may require the entire grille guard assembly to be removed and subsequently reinstalled when repairs or other work is performed on the front end of the vehicle. Additionally, when irreparable damage occurs to a single section of the single-unit grille guard assembly, the entire unit is replaced. Furthermore, the single-unit grille guard assembly is large and cumbersome, and thus, the expense of transporting and/or replacing the single-unit grille guard assembly is exacerbated by the cost of shipping.

In order to address some of the disadvantages of single-unit grille guard assemblies, some manufacturers produce modular grille guard assemblies comprised of members that are assembled by the end user. These modular grille guard assemblies are often assembled such that sections of the brush guard members are interlinked with sections of the grille guard member in an effort to strengthen the modular grille guard assembly. As a result, when damage occurs to one of the brush guard or grille guard members, other members of the grille guard assembly are usually damaged as well, resulting in decreased durability. Although conventional modular grille guard assemblies may address some of the deficiencies of single-unit assemblies, they fail to provide sufficient strength and durability, and, like single-unit assemblies, often require complete replacement when damage occurs to a member of the unit. Therefore, there exists a need for an automotive grille guard assembly capable of addressing the deficiencies of single-unit grille guard assemblies and conventional modular grille guard assemblies.

SUMMARY

The present disclosure provides an adjustable, modular automotive grille guard assembly comprising a base member having a first mounting surface and a second mounting surface; a first end member removably affixed to the first mounting surface of the base member and a first mounting member; and a second end member removably affixed to the second mounting surface of the base member and a second mounting member. Members of the disclosed grille guard assembly are comprised of metallic material, such as welded steel tubing, and are assembled using resilient hardware, thereby providing sufficient strength, whereas the disclosed modular design allows for adjustability and selective replacement of damaged members.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF THE DRAWINGS

Embodiments are illustrated by way of example in the accompanying figures not necessarily drawn to scale, in which like reference numbers indicate similar parts, and in which.

DETAILED DESCRIPTION OF THE DRAWINGS

Figure 1:
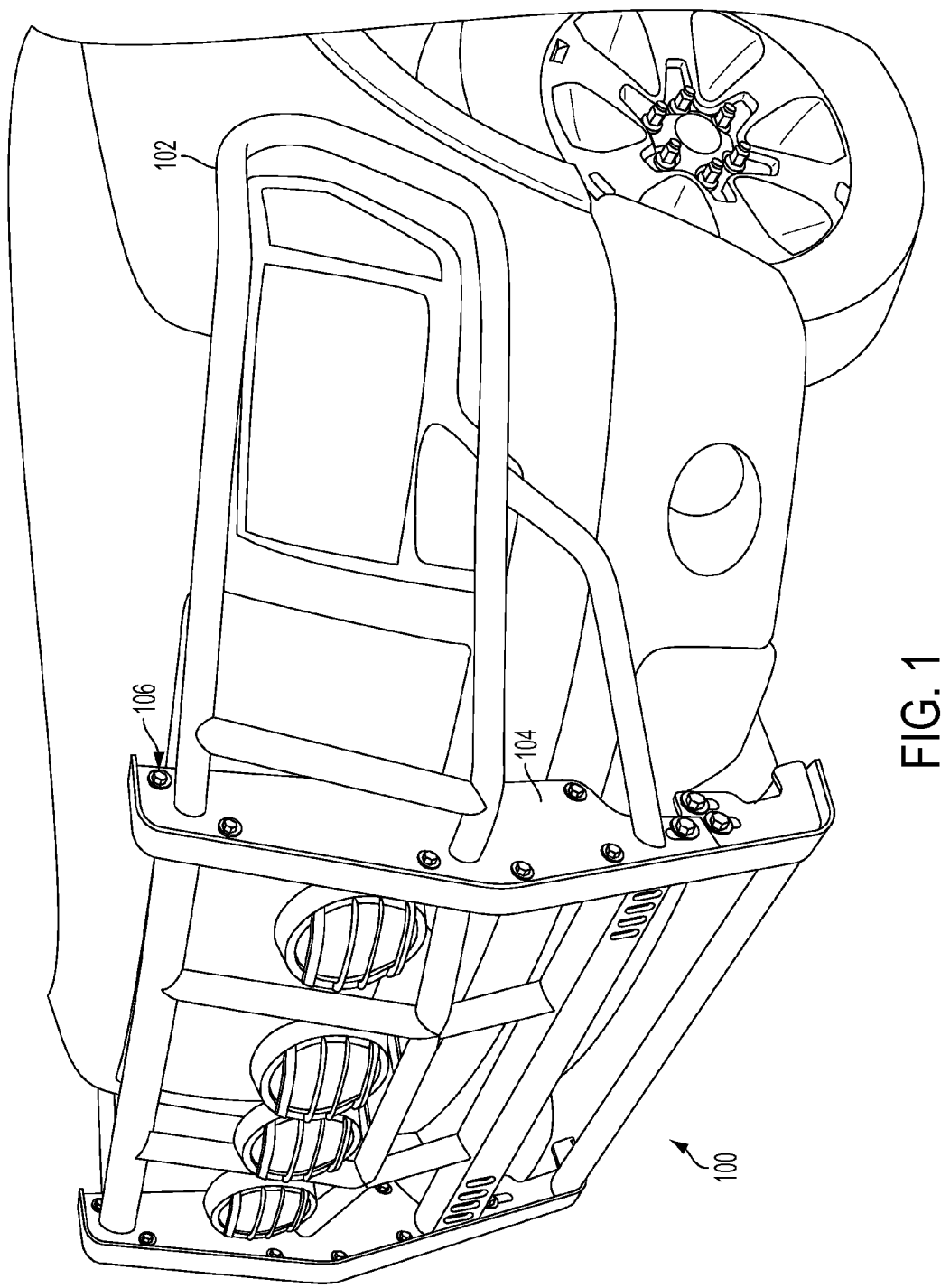
FIG. 1 illustrates a perspective view of an embodiment of an adjustable, modular grille guard assembly in accordance with the present disclosure.

FIG. 1 illustrates a perspective view of an embodiment of an adjustable, modular grille guard assembly 100 in accordance with the present disclosure. The disclosed modular grille guard assembly 100 addresses deficiencies of both single-unit grille guard assemblies and conventional modular grille guard assemblies. For example, unlike conventional modular grille guard assemblies, members of the disclosed modular grille guard assembly 100 are comprised of steel tubes 102 welded to mounting plates 104, wherein the mounting plates 104 for each of the members are coupled together using resilient mounting hardware 106. The disclosed modular grille guard assembly 100 is stronger and more durable than conventional modular grille guard assemblies and, as further explained below, may also be stronger than single-unit grille guard assemblies. Additionally, the removable mounting hardware 106 provides for easy assembly and disassembly of specific members of the modular grille guard assembly 100. Therefore, if one of the members of the grille guard assembly 100 becomes damaged, the damaged member may be quickly removed and/or replaced without having to replace or uninstall the entire grille guard assembly 100. Other advantages and features of the disclosed modular grille guard assembly 100 are further explained in the embodiments disclosed below.

Figure 2:
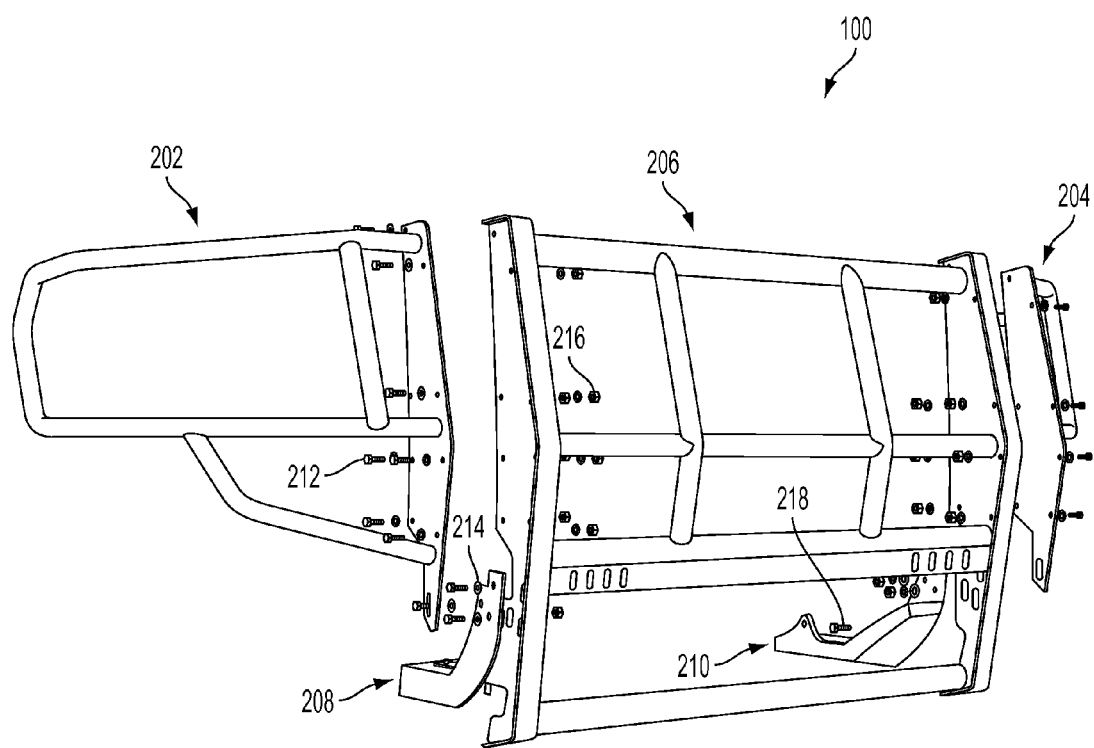
FIG. 2 illustrates an exploded view of the embodiment of the adjustable, modular grille guard assembly illustrated in FIG. 1.

FIG. 2 discloses an embodiment of the modular grille guard assembly 100 comprising first and second brush guard members 202 and 204 (also referred to as end or wing members) mounted to a grille guard member 206 (also referred to as a base member), wherein the first and second brush guard members 202 and 204 are generally mirrored copies of each other. However, in other embodiments, the first and second brush guard members 202 and 204 may be different in size and shape, and comprise different features, such as light mounts, steps or ladders for allowing the user to ascend or climb up the front of the vehicle, winches, and storage areas, such as racks for equipment and tools, fishing rod holders and firearm holders. The grille guard assembly 100 also includes mounting members 208 and 210 (also referred to as mounting brackets) for mounting the disclosed modular grille guard assembly 100 onto a vehicle (shown in FIG. 1). As mentioned above, the various members of the disclosed modular grille guard assembly 100 are removably coupled together using removable mounting hardware 106, wherein the mounting hardware 106 comprises removable fasteners such as, for example, bolts, nuts, rivets, screws, washers, quick-release fasteners, and/or other known fasteners and fastener components. In the embodiment shown in FIG. 2, the mounting hardware 106 includes bolts 212, washers 214, nuts 216, and screws 218.

Figure 3:
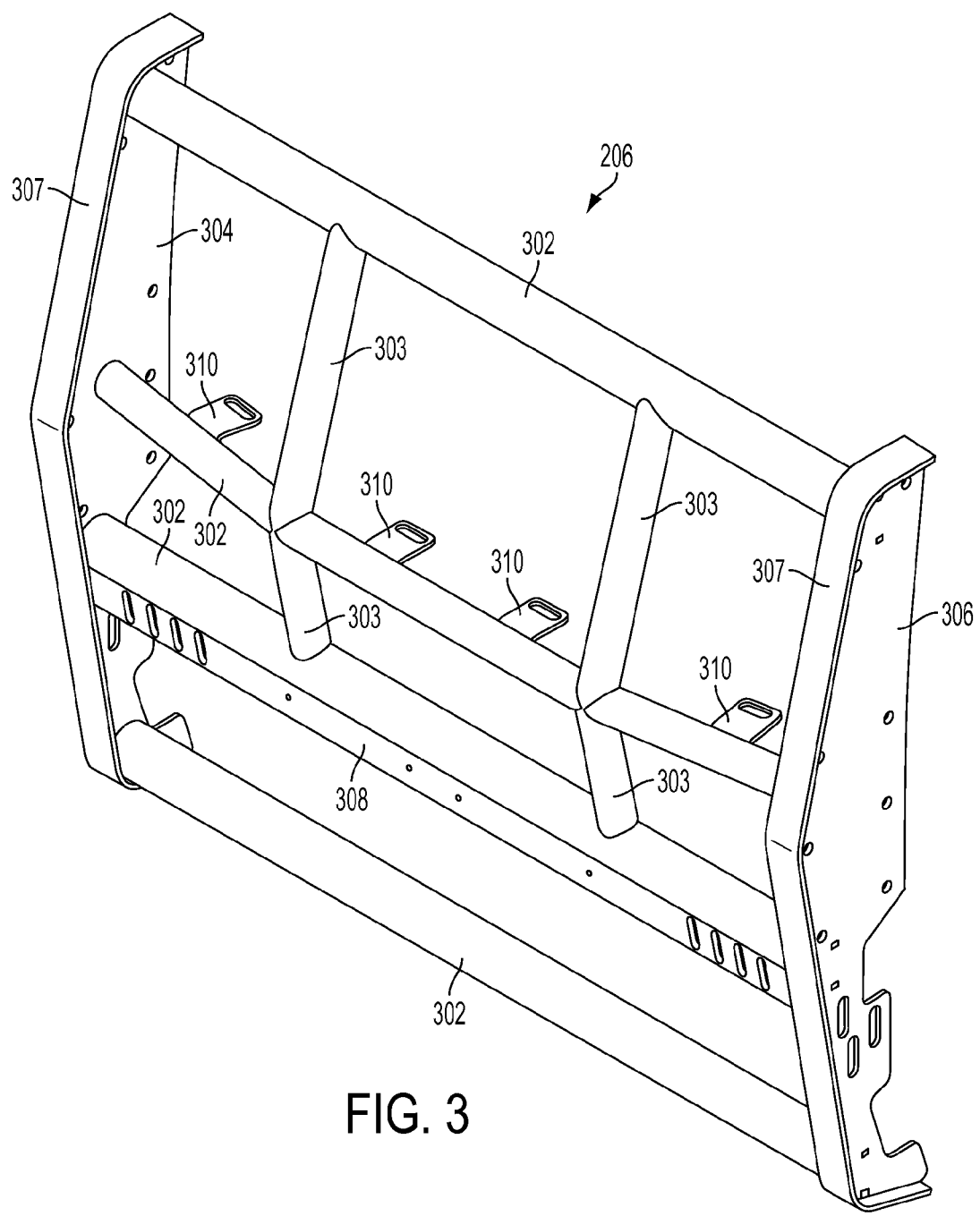
FIG. 3 illustrates a perspective view of an embodiment of the grille guard member shown in FIG. 2.

FIG. 3 illustrates a perspective view of one embodiment of the grille guard member 206 shown in FIG. 2. As shown in FIG. 3, the grill guard member 206 includes horizontal tubes 302 (also referred to as horizontal support members) welded to first and second mounting plates 304 and 306, and vertical tubes 303 (also referred to as vertical support members) welded to the horizontal tubes 302 to provide additional structural support. The mounting plates 304 and 306 are reinforced by plates 307 attached (e.g., welded) to edges of the respective mounting plates 304 and 306. The grille guard member 206 also includes a front plate 308 attached to a horizontal tube 302 and/or to mounting plates 304 and 306. The front plate 308 provides additional structural support to the grille guard member 206 and, in some embodiments, may provide a surface upon which a decal, logo, or other insignia may be applied or mounted. In some embodiments, the grille guard member 206 may further comprise mounting tabs 310 attached to one or more of the tubes 302/303, wherein the mounting tabs 310 allow for the attachment of lights or other equipment to the grille guard assembly 100. Although it is not shown in FIG. 3, the grille guard member 206 may also include other features, such as, for example, steps or ladders, winches, and storage compartments and storage racks. It should be appreciated by those of ordinary skill in the art that, in some embodiments, the grille guard member 206 may be designed to fit a specific make and model of a vehicle or, in other embodiments, may be designed as a universal member capable of fitting many various makes and models of vehicles.

Figure 4:
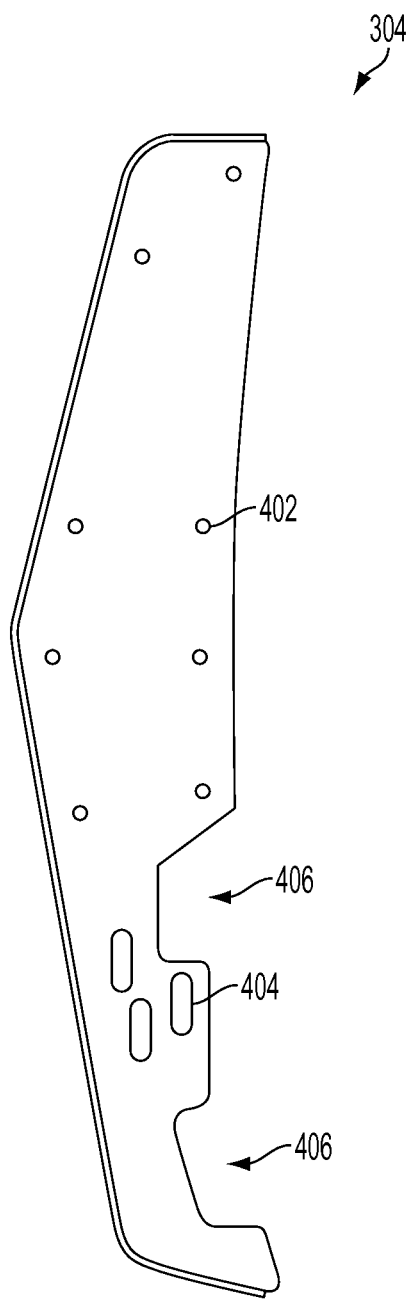
FIG. 4 illustrates an isolated view of an embodiment of a mounting plate of the grille guard member shown in FIG. 3.

FIG. 4 provides an isolated view of one embodiment of the first mounting plate 304 shown in FIG. 3. The first mounting plate 304 is a mirrored copy of the second mounting plate 306, and includes a plurality of holes 402 and slots 404 for receiving mounting hardware 106 (see FIGS. 1 and 2). In some embodiments, the grille guard assembly 100 may be adjusted for various reasons, wherein in some embodiments, the adjustment may include raising or lowering the vertical height of the grille guard assembly 100, moving the grille guard assembly 100 closer to or farther away from the grille of the vehicle, or tilting or canting the grille guard assembly 100 towards or away from the grille of the vehicle to, for example, allow for greater access to the grille or front of the vehicle, or to the grille guard assembly 100. As such, the first mounting plate 304 and second mounting plate 306 may also include one or more recesses 406 to allow clearance for the vehicle during and/or after adjustment of the grille guard assembly 100. In the embodiment illustrated in FIG. 4, the slots 404 are elongated to facilitate the adjustment of the grille guard member 206 (and attached brush guard members 202 and 204) to various positions. Accordingly, the grille guard assembly 100 may be adjusted by loosening or temporarily removing one or more of the fasteners installed in the slots 404 to allow the grille guard assembly 100 to adjust, slide or otherwise move as allowed by the elongated shape of the slots 404. Once the grille guard assembly 100 has been adjusted, the fasteners may be tightened or reinstalled to secure the grille guard assembly 100 in the adjusted position. In some embodiments, the slots 404 in the mounting plates 304 and 306 (as well as corresponding slots in other members of the assembly 100) may be curved or otherwise shaped to facilitate specific positions or to alter or enhance the raising, lowering, tilting, and/or canting of the grille guard assembly 100.

Figure 5:
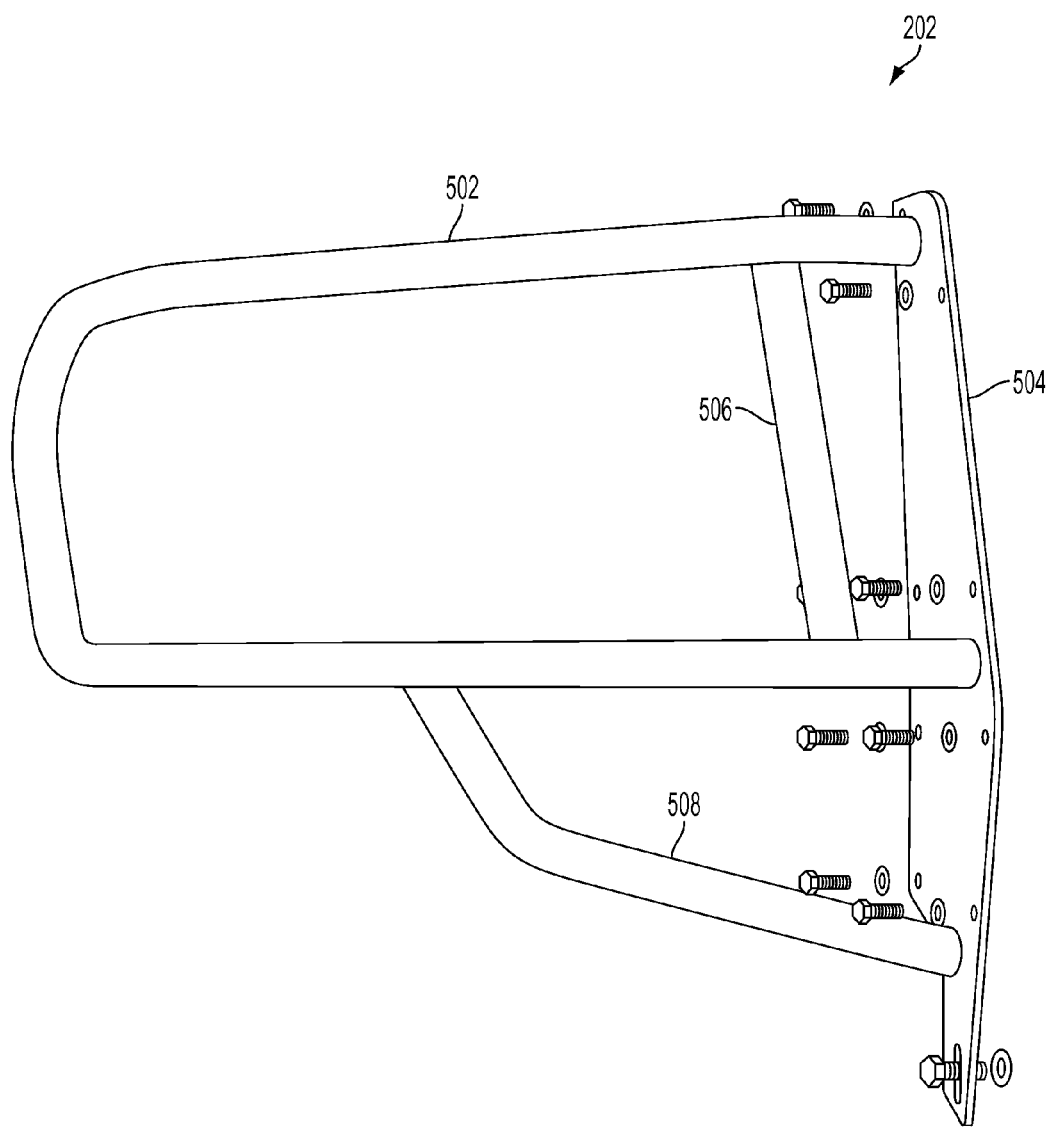
FIG. 5 illustrates a perspective view of an embodiment of the first brush guard member shown in FIG. 2.

FIG. 5 illustrates a perspective view of one embodiment of the first brush guard member 202 shown in FIG. 2. As shown in FIG. 5, the first brush guard member 202 is comprised of metal tubing 502 welded to a metal mounting plate 504. In the embodiment illustrated in FIG. 5, the brush guard member 202 also includes a vertical metal tube 506 welded between the metal tubing 502, and metal support tubing 508 welded to the mounting plate 504 and tubing 502. The first brush guard member 202 shown in FIG. 5 is designed to protect the vicinity of the passenger-side headlight assembly of a vehicle from damage with minimal obstruction of light produced by the headlight assembly (or light produced by other lights in the vicinity of the headlight assembly, such as fog lights, parking lights, signal indicators, etc.). As such, in some embodiments, the brush guard members may be designed to fit a specific make and model of a vehicle or, in other embodiments, may be designed as a universal member capable of fitting many various makes and models of vehicles.

Figure 6:
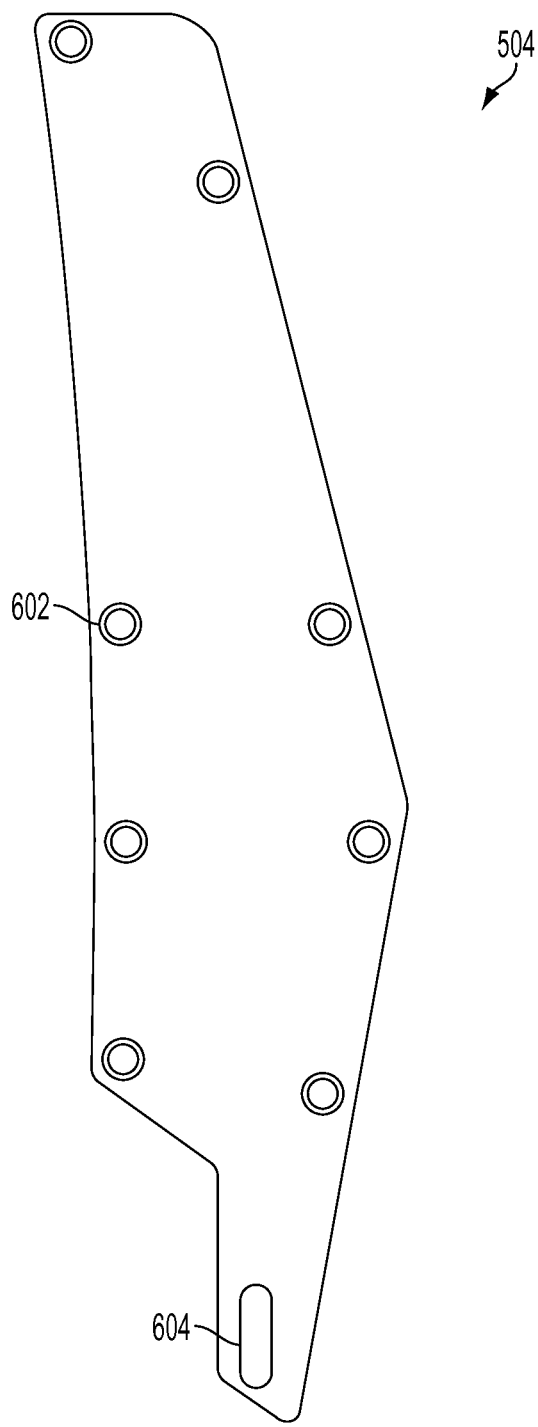
FIG. 6 illustrates an isolated view of an embodiment of the brush guard mounting plate shown in FIG. 5.

FIG. 6 provides an isolated view of one embodiment of the mounting plate 504 shown in FIG. 5. The mounting plate 504 includes a plurality of holes 602 and a slot 604 for receiving the mounting hardware 106. As mentioned above, the brush guard members 202 and 204 are mounted to respective mounting plates 304 and 306 of the grille guard member 206 using the removable mounting hardware 106. In accordance with the embodiments illustrated in FIGS. 2-6, the first brush guard member 202 may be mounted to the grille guard member 206 by aligning the holes 602 of the brush guard mounting plate 504 with the holes 402 of the grille guard mounting plate 304, and installing removable mounting hardware such as, for example, a bolt, one or more washers, and a nut. As discussed in greater detail below, mounting hardware may also be installed through the slot 604 in the brush guard mounting plate 504 and one of the slots 404 in the grille guard mounting plate 304. The slot 604 is elongated to facilitate the adjustment of the position of the brush guard member 202 when the grille guard member 206 is being adjusted. Thus, the slot 604 allows the brush guard member 202 to be tilted, slid, or otherwise adjusted with the grille guard member 206.

It should be appreciated by those of ordinary skill in the art that the use of resilient mounting hardware, such as that disclosed herein, provides a bond that is stronger than that of a traditional weld. As such, the disclosed modular grille guard assembly 100 provides superior strength to single-unit grille guard assemblies manufactured using only welds. Additionally, because some embodiments of the grille guard assembly 100 are comprised of steel and steel tubing, the superior strength and durability of the disclosed modular grille guard assembly 100 is further enhanced as compared to conventional modular grille guard assemblies.

Figure 7:
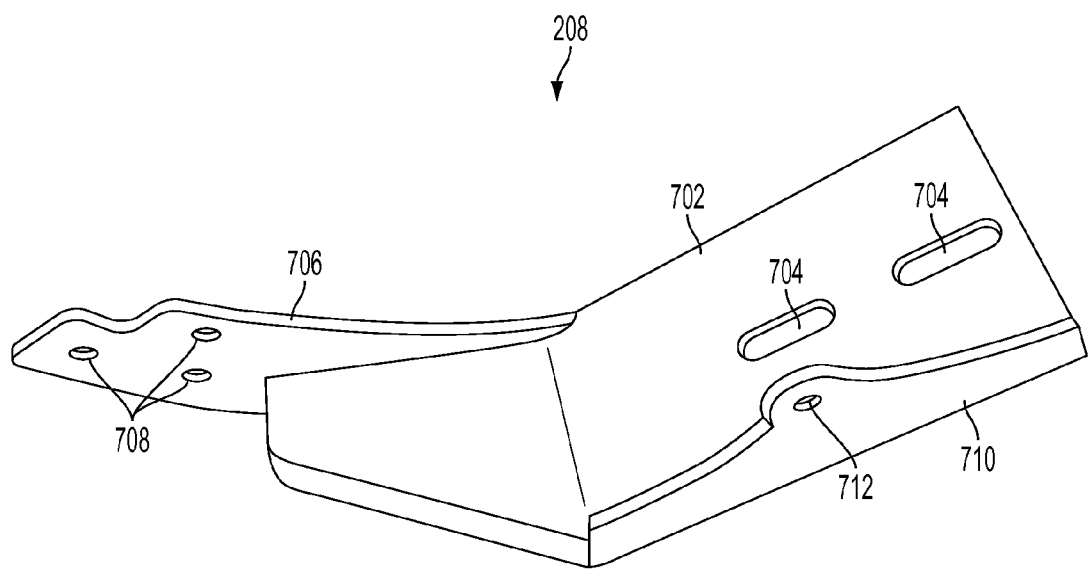
FIG. 7 illustrates a perspective view of an embodiment of the first mounting member shown in FIG. 2.

FIG. 7 illustrates a perspective view of an embodiment of the first mounting member 208 shown in FIG. 2. The first mounting member 208 and the second mounting member 210 are mounted to the vehicle and coupled to the grille guard member 206 and respective first and second brush guard members 202 and 204 so that the grille guard assembly 100 is mounted (i.e., installed) onto the vehicle. The mounting member 208 shown in FIG. 7 includes a base portion 702 having mounting slots 704, a first flange 706 having member mounting holes 708, and a second flange 710 having a frame mounting hole 712. The mounting member 208 may be mounted to the frame of a vehicle using mounting hardware such as, for example, bolts, nuts, washers, and bolt plates (not shown). Additionally, the mounting member 208 may be further secured to the frame of the vehicle by inserting a screw or other fastener through the frame mounting hole 712 and into the frame of the vehicle. In some embodiments, the mounting members 208 and 210 may be sized and/or shaped to permit the installation of tow hooks in juxtaposition with the mounting members 208 and 210.

As discussed above, the first mounting member 208 (as well as second mounting member 210) are installed onto the vehicle by inserting mounting hardware (e.g., screws, bolts, etc.) through the mounting slots 704 and into the frame of the vehicle. The mounting slots 704 are elongated to allow the position of the mounting members 208 or 210 (relative to the frame of the vehicle) to be selected so that the assembled and installed grille guard assembly 100 is positioned at a desired distance from the front of the vehicle. Accordingly, the distance of the grille guard assembly 100 from the front of the vehicle may be adjusted by loosening or removing the hardware mounting the first and second mounting members 208 or 210 to the frame of the vehicle, adjusting the position of the mounting brackets along the lengths of the mounting slots 704 so that the position of the grille guard assembly 100 is a desired distance from the front of the vehicle, and tightening or reinstalling the mounting hardware to retain the grille guard assembly 100 in the adjusted position.

Figure 8:
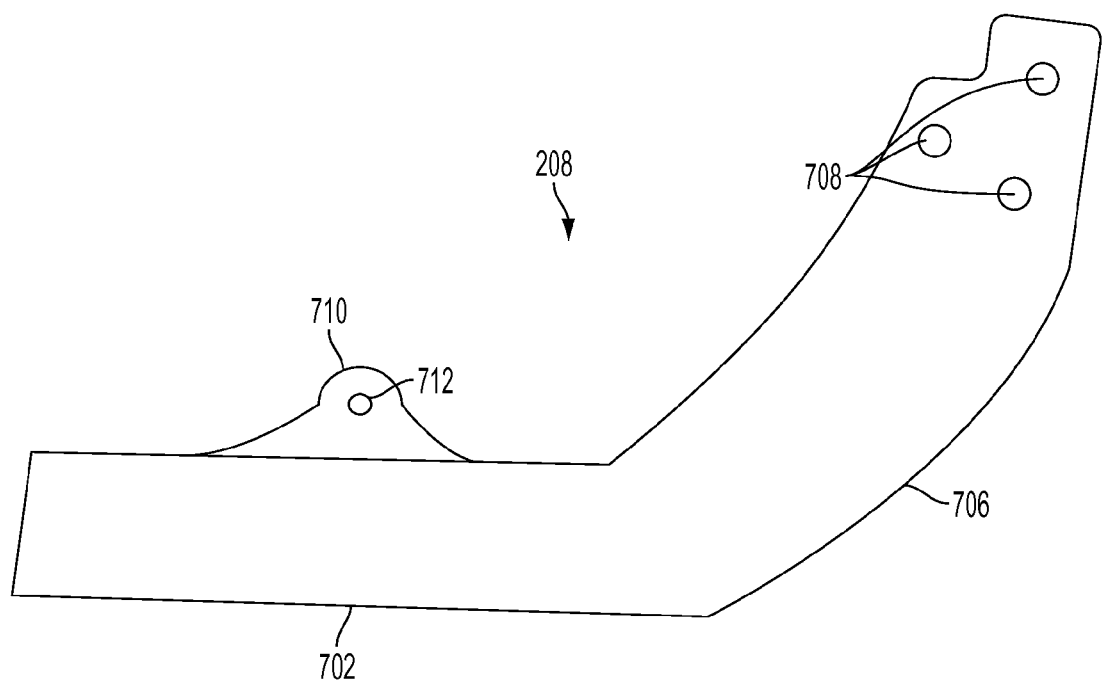
FIG. 8 illustrates a profile view of an embodiment of the first mounting member shown in FIG. 7.

FIG. 8 illustrates a profile view of an embodiment of the first mounting member 208 showing the first flange 706 and member mounting holes 708. In accordance with the present disclosure, the first brush guard member 202 and grille guard member 206 may be coupled to the first mounting member 208 using removable mounting hardware, as discussed above. In one particular embodiment, the members may be coupled by inserting a bolt, for example, through the slot 604 in the brush guard mounting plate 504, through a corresponding slot 404 in the grille guard mounting plate 304, and through a corresponding member mounting hole 708, and then securing the bolt with a washer and nut. Similarly, mounting hardware may be used to couple the first flange 706 to the grille guard mounting plate 304 by installing mounting hardware through the remaining grille guard slots 404 and corresponding member mounting holes 708 in the manner discussed above. When the mounting hardware installed in the member mounting holes 708 is removed or loosened, the position of the grille guard member 206 and attached brush guard members 202 and 204 may be adjusted along the first flange 706. Thus, in some embodiments, it may be desirable to use quick-release fasteners that allow for expedited loosening or removal of the mounting hardware so that quicker and easier adjustment of the grille guard member 206 and the attached brush guard members 202 and 204 can be achieved.

Figure 9A:
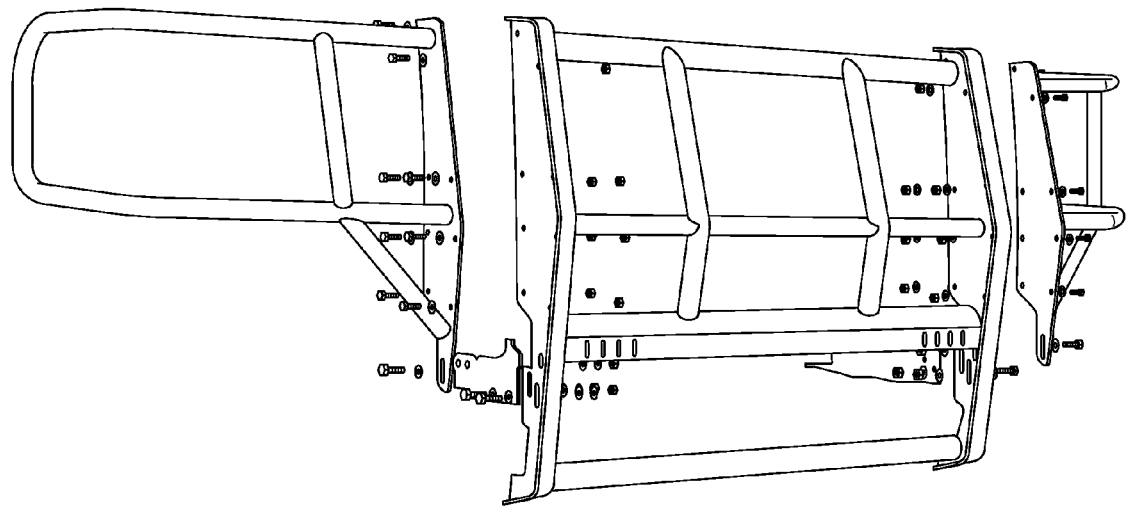
FIGS. 9A, 9B and 9C illustrate exploded views of various example embodiments of an adjustable, modular grille guard assembly in accordance with the present disclosure.
Figure 9B:
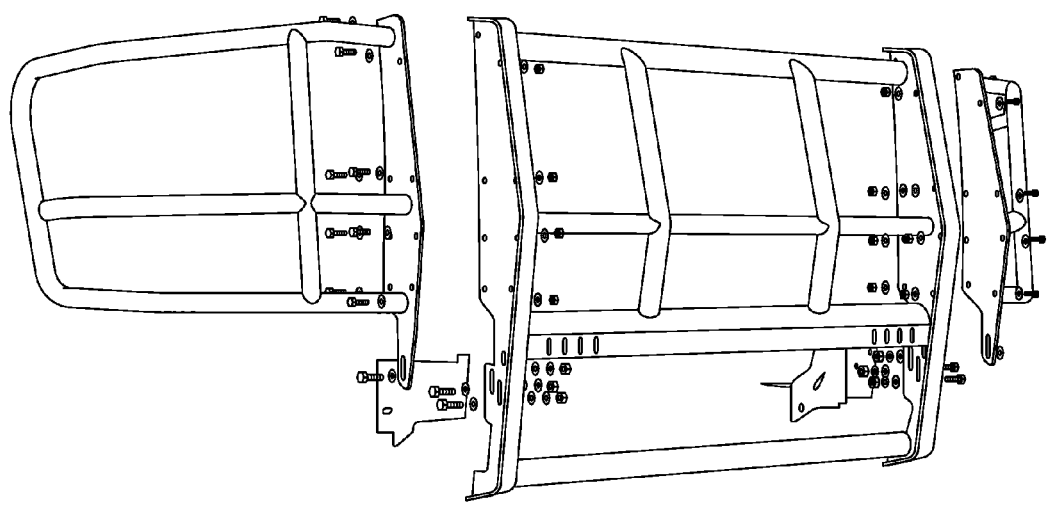
Figure 9C:
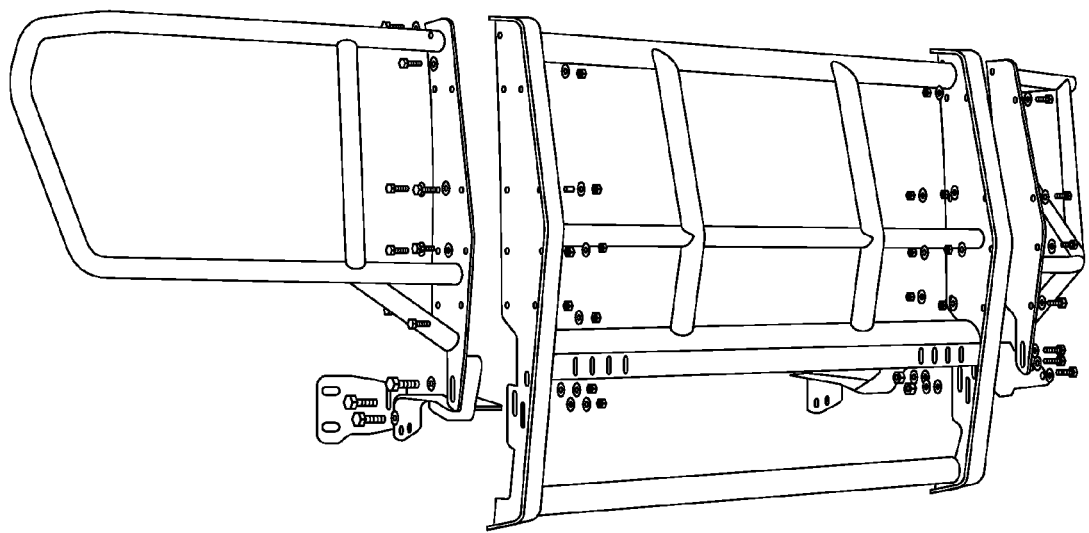
Figure 10A:
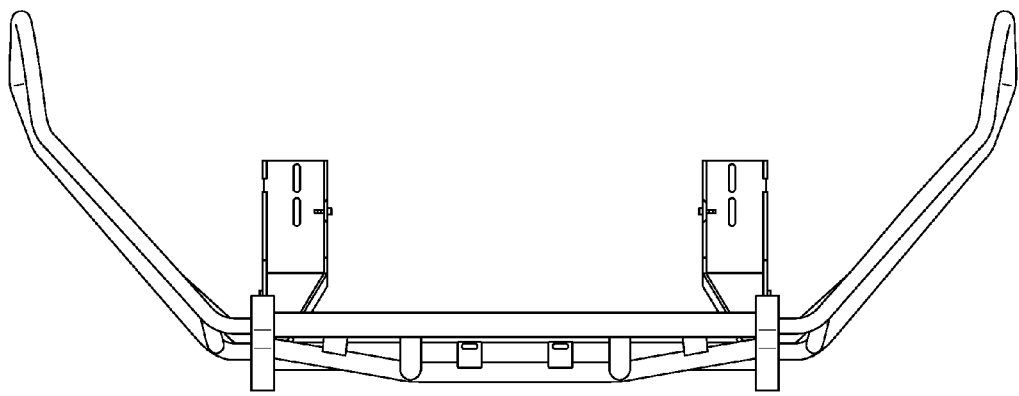
FIGS. 10A, 10B, 10C and 10D illustrate various views of an example embodiment of an adjustable, modular grille guard assembly in accordance with the present disclosure.
Figure 10B:
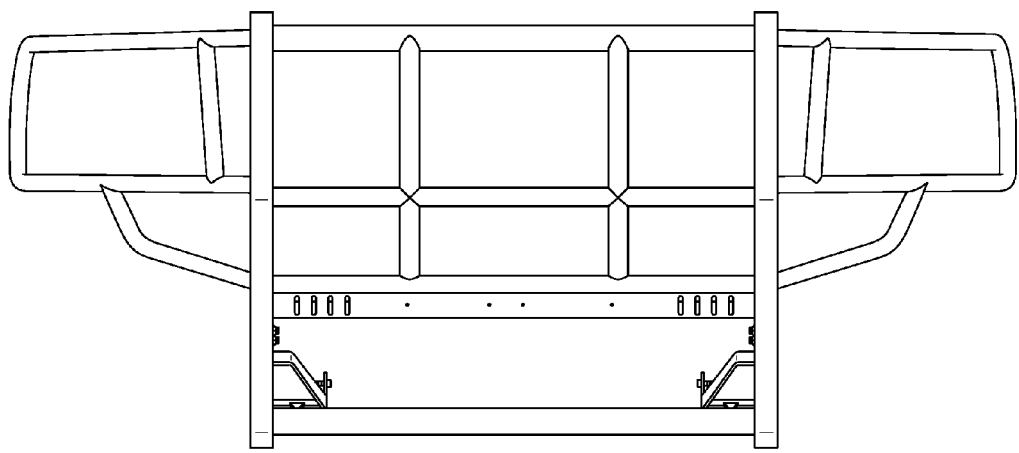
Figure 10C:
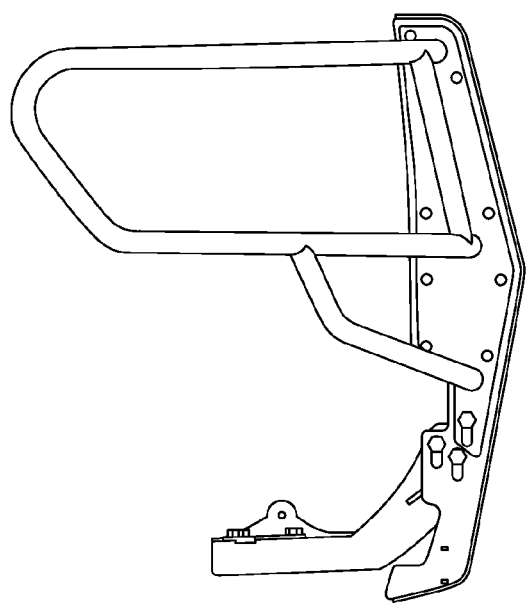
Figure 10D:
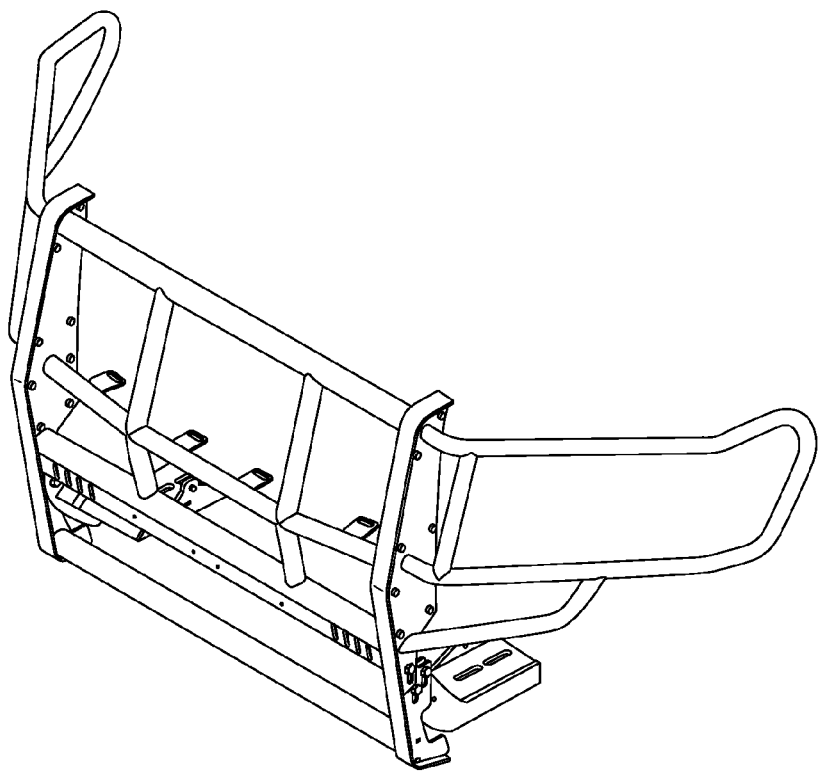
Figure 11A:
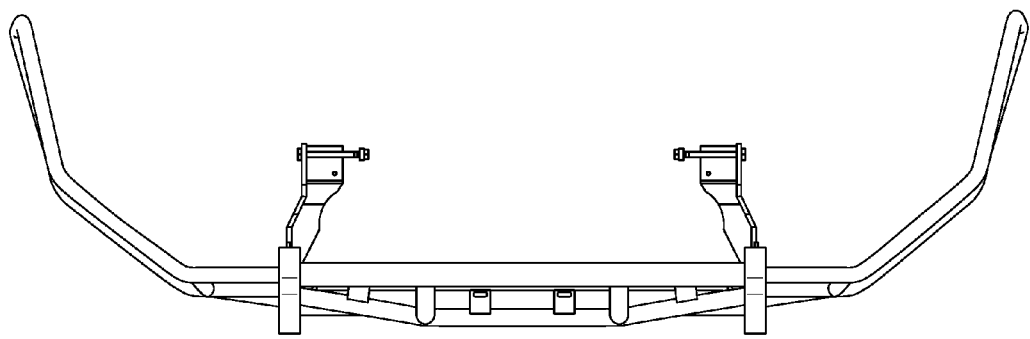
FIGS. 11A, 11B, 11C and 11D illustrate various views of an example embodiment of an adjustable, modular grille guard assembly in accordance with the present disclosure.
Figure 11B:
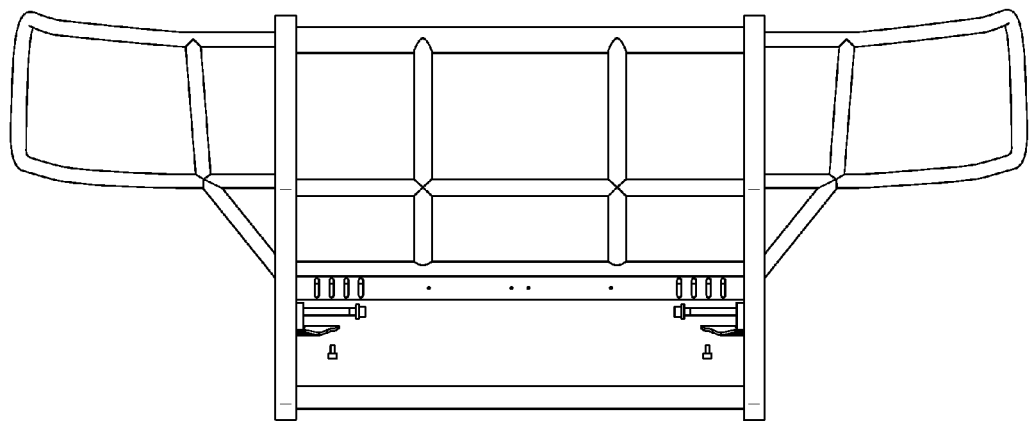
Figure 11C:
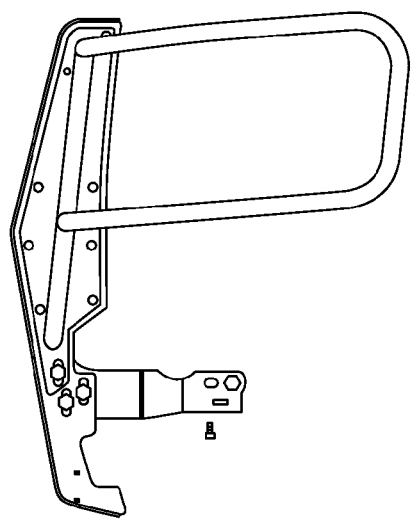
Figure 11D:
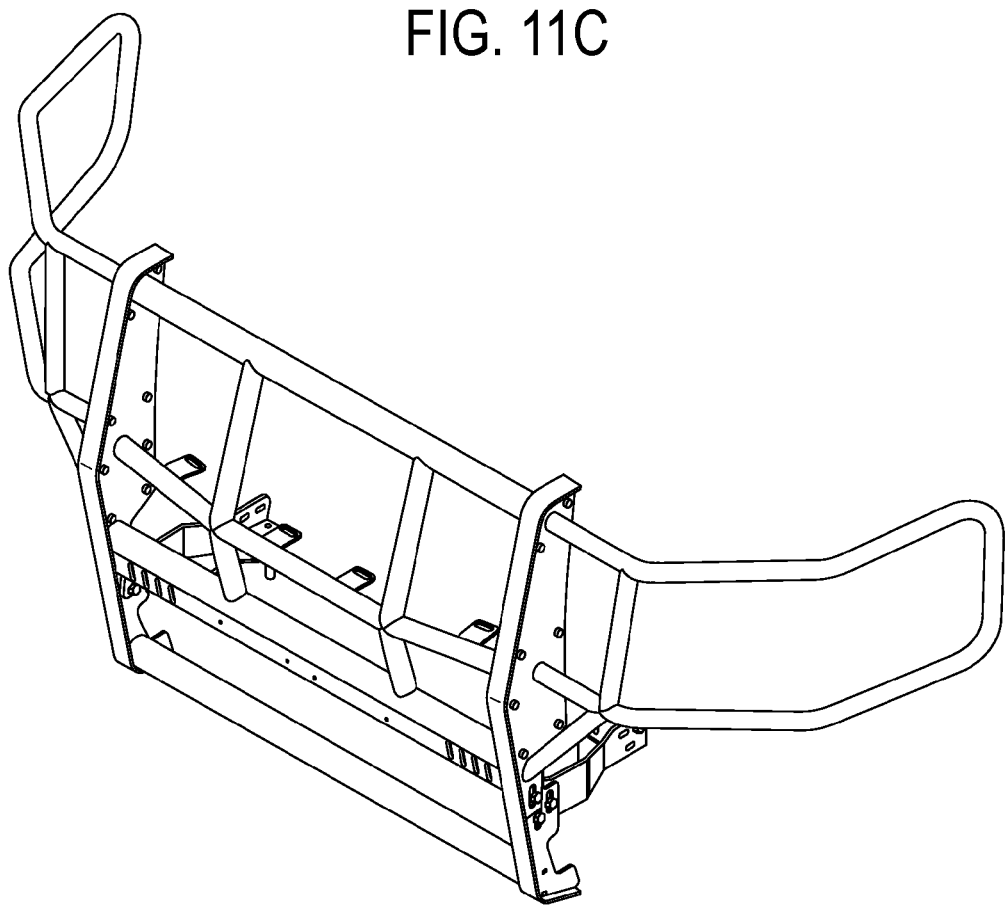
Figure 12A:
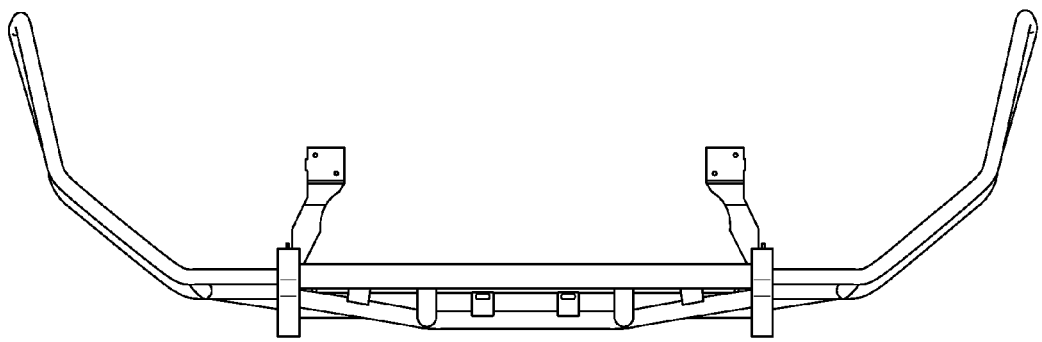
FIGS. 12A, 12B, 12C and 12D illustrate various views of an example embodiment of an adjustable, modular grille guard assembly in accordance with the present disclosure.
Figure 12B:
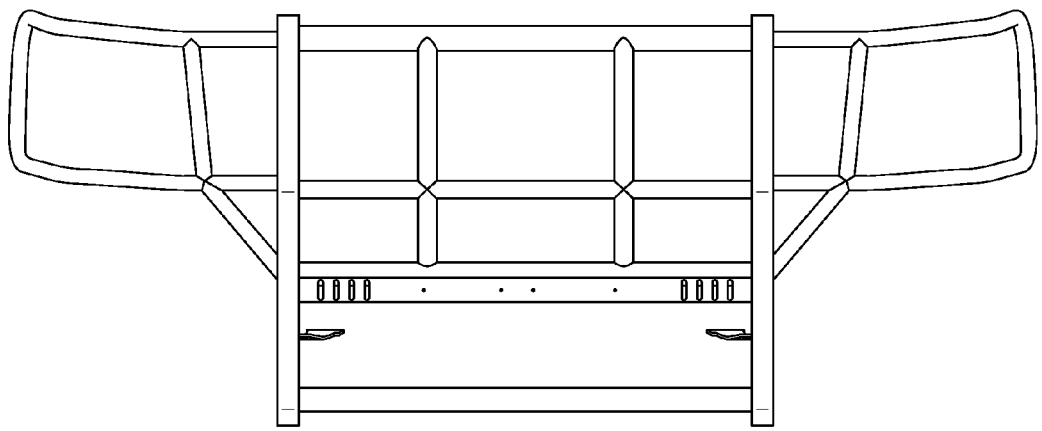
Figure 12C:
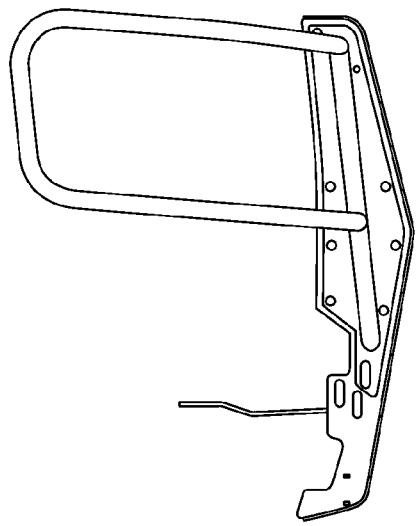
Figure 12D:
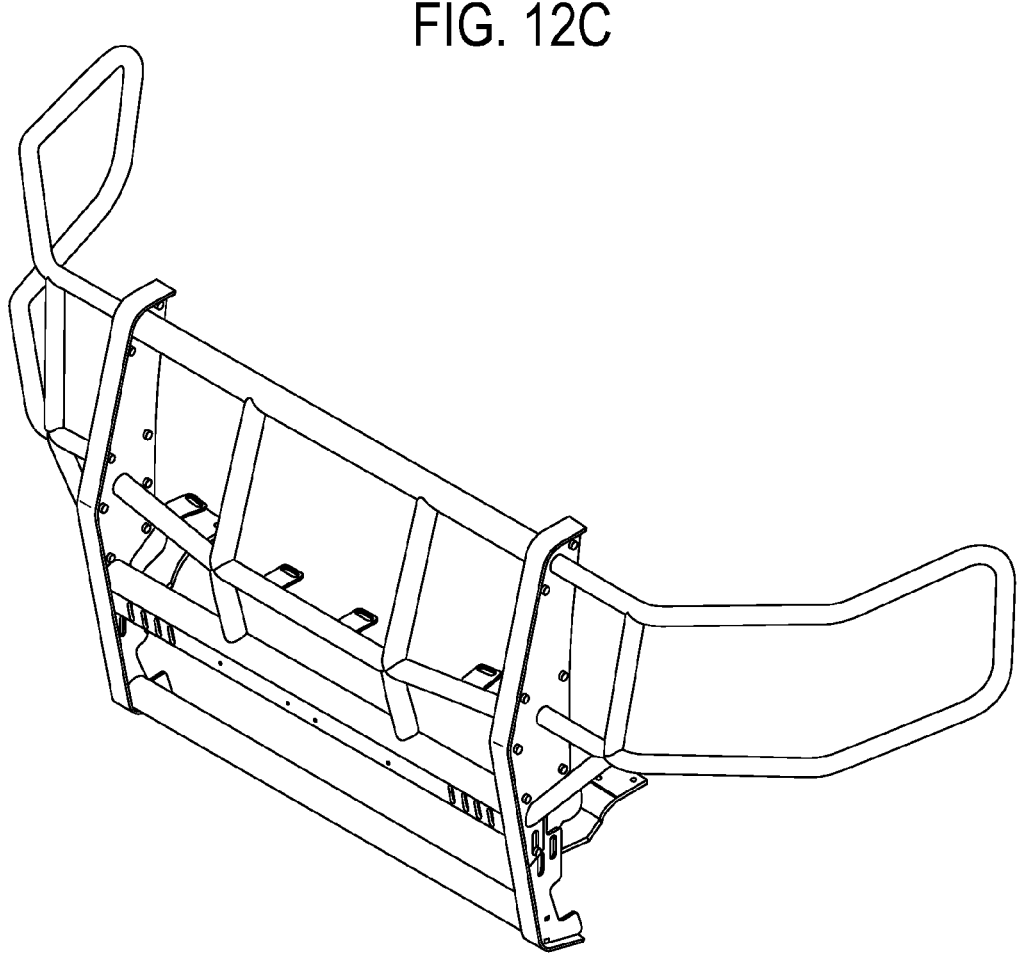

FIGS. 9A, 9B and 9C illustrate various example embodiments of an adjustable, modular grille guard assembly in accordance with the present disclosure. Additionally, FIGS. 10A-10D, 11A-11D, and 12A-12D illustrate various views of example embodiments of an adjustable, modular grille guard assembly in accordance with the present disclosure.

When installed on a vehicle, the disclosed modular grille guard assembly 100 is operable to protect the front of the vehicle, and to alleviate possible damage sustained during an impact by redistributing force applied to the grille guard assembly 100. Specifically, force applied to the grille guard assembly 100 is distributed among the mounting hardware and members of the assembly 100, to the mounting members 208 and 210, and to the frame of the vehicle. By redistributing the force of the impact, the grille guard assembly is able to absorb and dampen energy that may otherwise damage the vehicle.

In one embodiment of the present disclosure, the modular grille guard assembly 100 may be designed with both universal and model-specific members. Such a design may offer several advantages such as, for example, saving on inventory and manufacturing expenses. For example, the grille guard member 206 may be designed as a universal grille guard member capable of fitting various makes and year models of vehicles. Accordingly, the brush guard members and mounting members may be designed for specific makes and year models of vehicles. Since, in this embodiment, the model-specific members are smaller than the universal members, a supplier can stock fewer large, universal members, and more smaller, model-specific members. Thus, when compared to stocking single-unit grille guard assemblies, stocking the disclosed modular grille guard assembly 100 allows suppliers to optimize their inventory by allowing them to outfit a greater number of vehicles with less space in inventory. Additionally, manufacturing expenses may be reduced through increased efficiency of the utilization of resources and equipment. For example, changes may be made to the design of a specific year-model member by changing only the processes for manufacturing those specific members, thereby allowing continued manufacturing of the universal and other model-specific members.

Figure 13A:
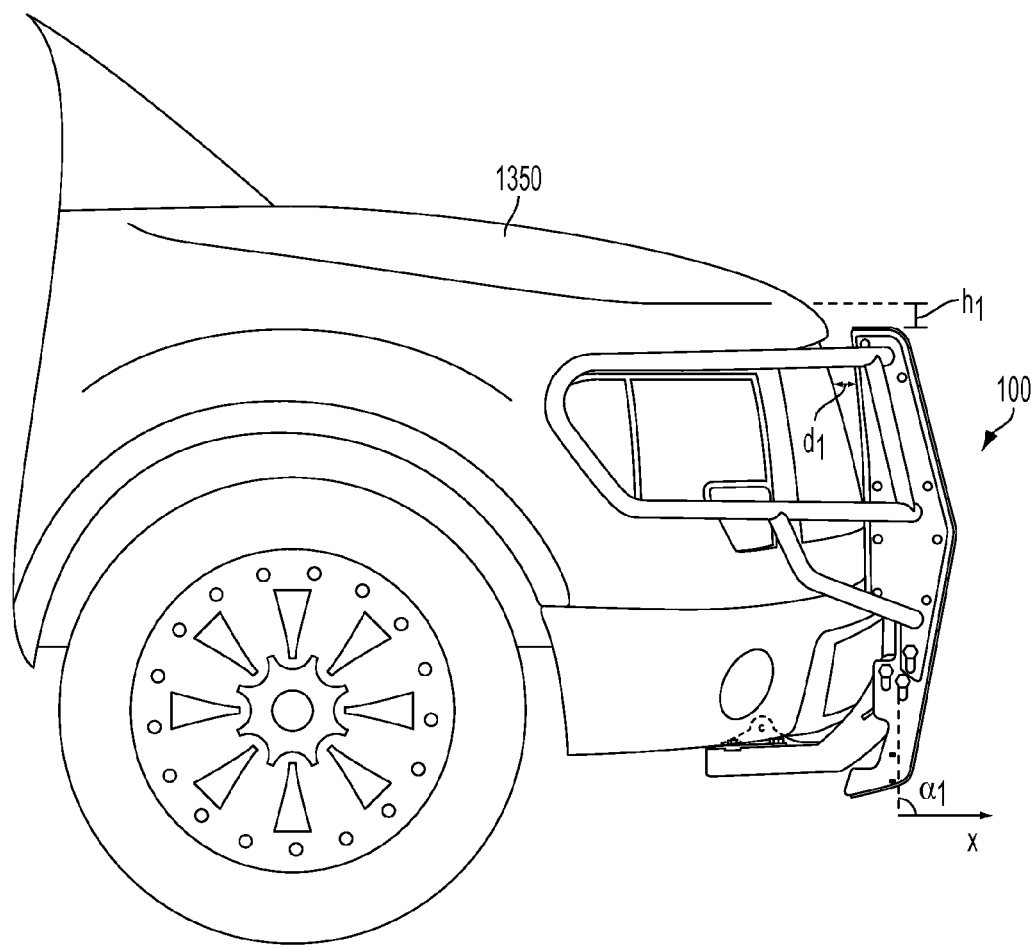
FIGS. 13A, 13B, 13C and 13D illustrate various adjusted positions of an example embodiment of an adjustable, modular grille guard assembly in accordance with the present disclosure.
Figure 13B:
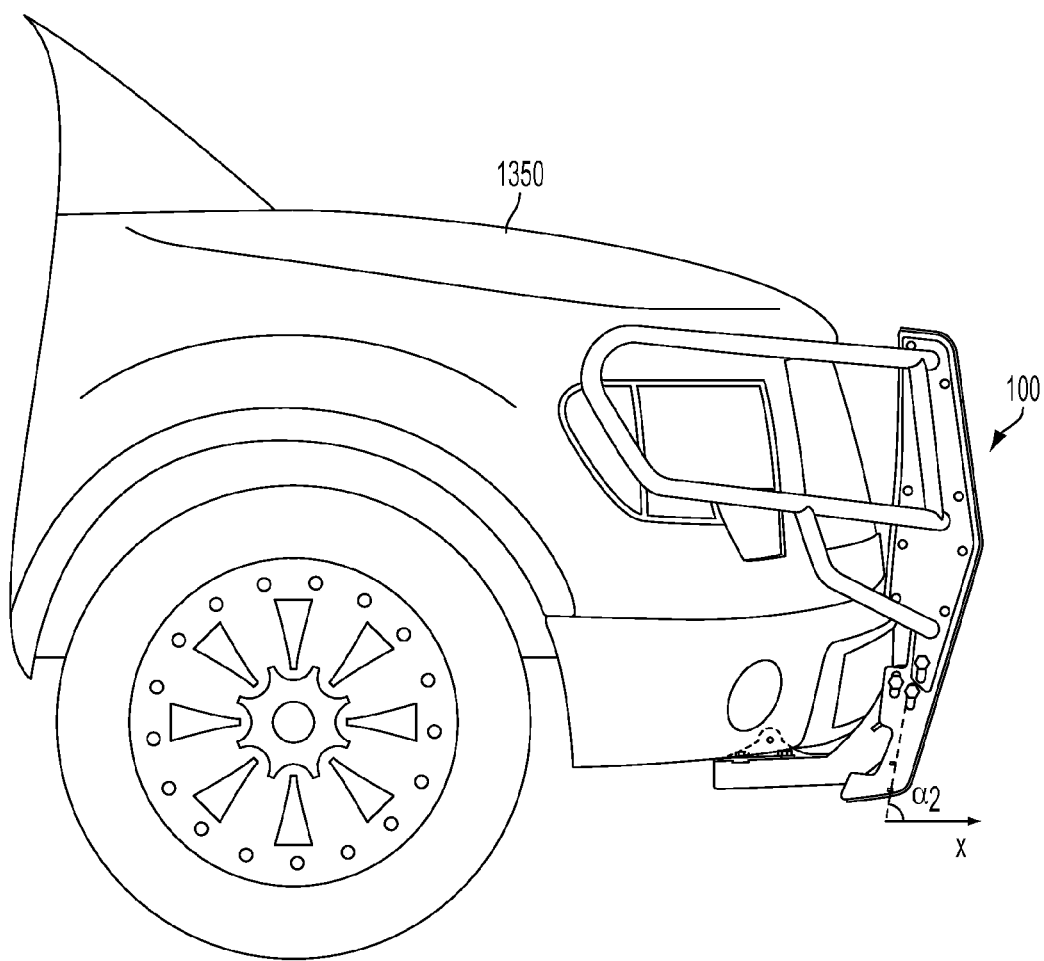
Figure 13C:
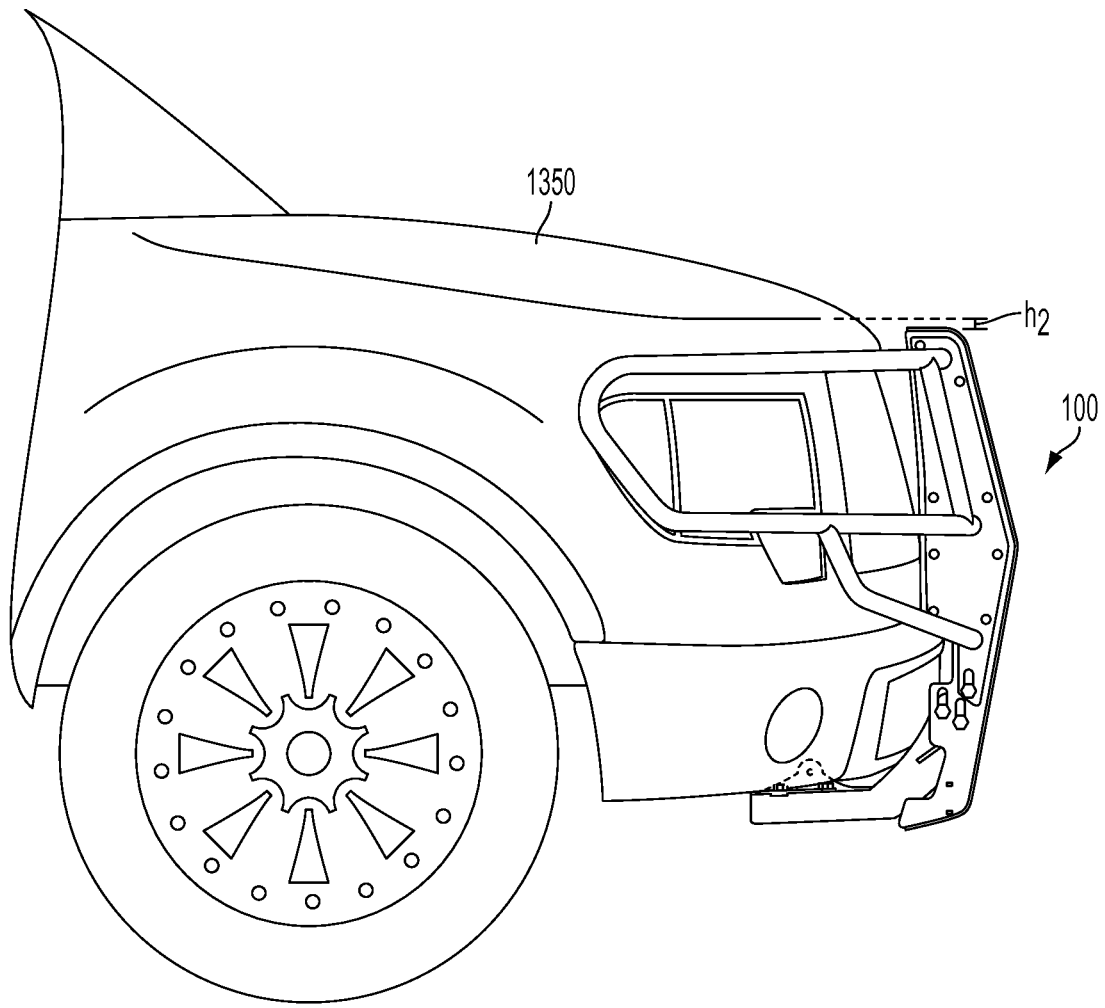
Figure 13D:
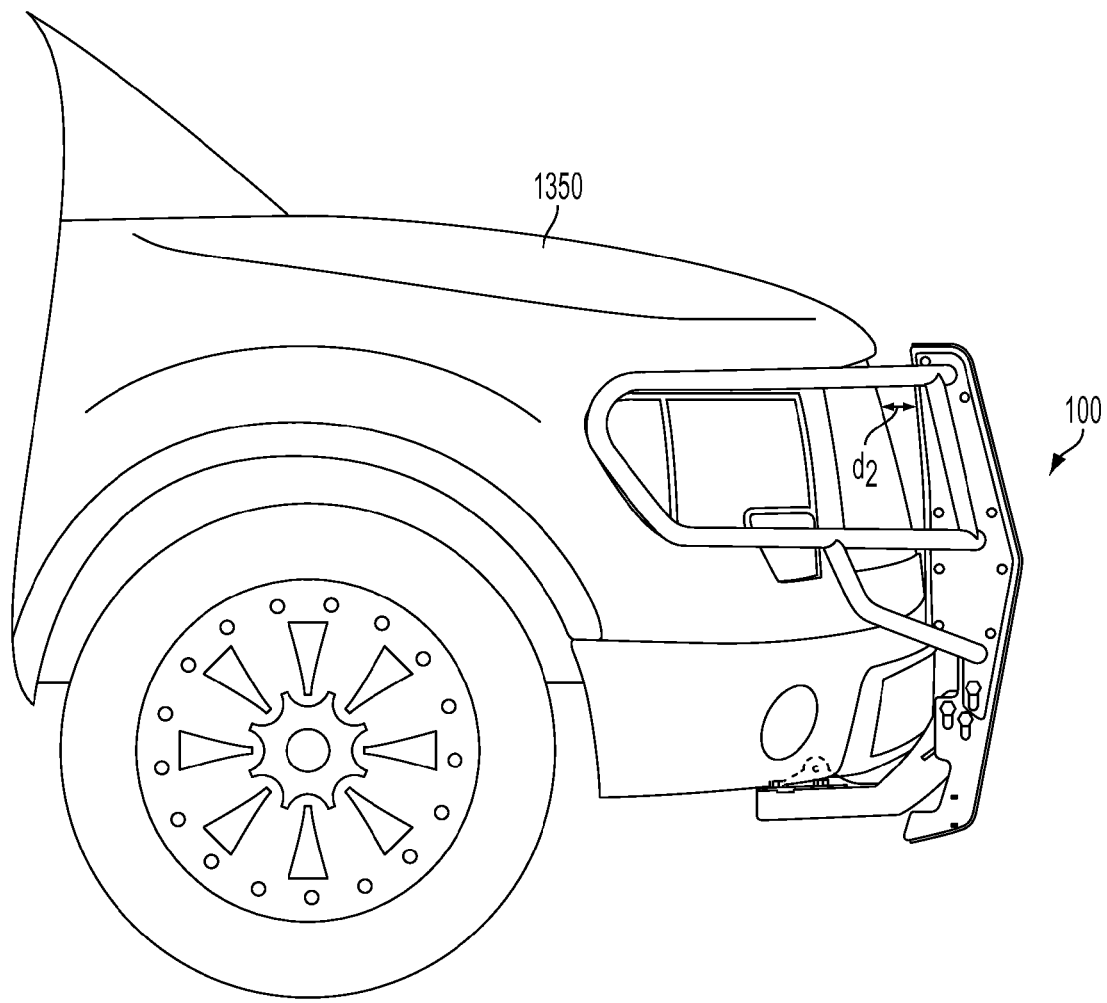

Another advantage of the disclosed modular grille guard assembly is the ability to adjust the position of the assembly. For example, FIGS. 13A-13D illustrate various adjusted positions of an example embodiment of the grille guard assembly 100 relative to a vehicle 1350. FIG. 13A shows a first position of the grille guard assembly 100, wherein the first position provides a first height $h_1$ and distance $d_1$ relative to the vehicle 1350 and a first angle of tilt a/relative to a horizontal axis x. FIG. 13B shows a second position wherein the grille guard assembly 100 is adjusted to a second angle of tilt $\alpha_2$ relative to the horizontal axis x, so that it is tilted forward, away from the vehicle 1350. FIG. 13C illustrates another position wherein the grille guard assembly 100 is adjusted to a second height $h_2$ relative to the vehicle 1350. FIG. 13D illustrates yet another position wherein the grille guard assembly 100 is adjusted so that it is positioned a second distance $d_2$ from the front of the vehicle 1350. As mentioned above, the height or tilt of the assembly 100 may be adjusted by loosening or removing fasteners affixed to the holes 708 in the mounting members 208 and 210, and then tilting, sliding, and/or canting the grille guard member 206 to a desired position. The fasteners may then be tightened or reinstalled to secure the grille guard member 206 in the adjusted position, or may be tightened or reinstalled when the grille guard member 206 is returned to its original position. Furthermore, the distance of the grille guard assembly 100 from the vehicle may be adjusted by loosening or removing the hardware mounting the first and second mounting members 208 or 210 to the frame of the vehicle, adjusting the position of the mounting brackets along the lengths of the mounting slots 704 so that the position of the grille guard assembly 100 is a desired distance from the front of the vehicle, and tightening or reinstalling the mounting the hardware to retain the grille guard assembly 100 in the adjusted position.

The ability to adjust the disclosed modular grille guard assembly 100 addresses many of the disadvantages of single-unit grille guard assemblies. For example, adjustment of the assembly 100 allows quick and easy access to the engine compartment, or other areas of the front of the vehicle that may have been previously inaccessible or difficult to access, without having to remove the grille guard assembly 100. Thus, the grille guard assembly 100 may not have to be removed in order to, for example, perform work on the radiator, change the oil, replace a headlight bulb, or to perform other various tasks that require access to the front of the vehicle. Additionally, the grille guard assembly 100 may be adjusted to accommodate aftermarket modifications such as, for example, a hood or grille of a size different than the factory specifications. It should be appreciated that, in some embodiments, the adjustability of the grille guard assembly may allow for a wider range of grille guard member and brush guard member designs that may be manufactured for a specific vehicle. Similarly, a grille guard member and/or brush guard member designed for a particular vehicle make and model may also fit other vehicle makes and models as a result of being adjustable.

Yet another advantage provided by the disclosed modular grille guard assembly 100 is the ability to quickly and easily remove and/or replace specific members of the assembly 100. For example, if an individual wishes to replace a headlight without adjusting the grille guard assembly 100 as discussed above, access to the particular headlight may be achieved by uninstalling a single brush guard member 202 or 204. Thus, the headlight may be accessed without having to remove or adjust the entire grille guard assembly 100. In this manner, the ability to quickly remove and/or replace members of the assembly 100 may be used in lieu of the aforementioned ability to adjust the grille guard assembly 100. However, in some embodiments, this ability may actually complement the adjustability of the disclosed modular grille guard assembly 100.

The ability to quickly and easily remove and/or replace specific members of the assembly 100 also addresses many of the deficiencies of single-unit assemblies and conventional modular assemblies. When single-unit grille guard assemblies are irreparably damaged, the entire assembly is replaced. Similarly, when damage occurs to a single member of conventional modular grille guard assemblies, other members of the grille guard assembly are usually damaged as a result of their construction, thereby necessitating replacement of the entire unit (or at least multiple members of the assembly). However, the disclosed modular grille guard assembly 100 is comprised of resilient members removably coupled to each other. Therefore, if damage occurs to a single member of the disclosed modular grille guard assembly 100, the damaged member may be replaced without having to replace the entire grille guard assembly 100. It should be appreciated that, in some embodiments, the quick and easy removal and/or replacement of specific members may be enhanced by the use of quick-release fasteners or the like.

In view of the foregoing, the disclosed modular grille guard assembly addresses many of the deficiencies of single-unit grille guard assemblies and conventional modular grille guard assemblies. For example, unlike single-unit grille guard assemblies, the adjustable, modular design of the disclosed modular grille guard assembly 100 allows the assembly to fit various vehicles, is conducive to aftermarket exterior modifications, is cost efficient for manufacturers and suppliers, does not have to be uninstalled when work is performed on the front of the vehicle, and allows for quick and easy removal/replacement of specific members. Additionally, due to its modular design, the disclosed grille guard assembly is cheaper and easier to ship than single-unit grille guard assemblies since it may be broken down to fit into smaller containers. Unlike conventional modular grille guard assemblies, the disclosed modular grille guard assembly is adjustable, provides sufficient strength and durability due to its design and construction materials, and allows for selective replacement of fewer damaged members.

It should be understood that the grille guard member, brush guard members, mounting members, and mounting hardware shown and described herein represent various example embodiments of the disclosed modular grille guard assembly. As such, the grille guard assembly and individual members of the assembly should not be limited to the designs or physical appearances shown and described herein, and may be altered or otherwise modified without departing from the spirit or scope of the claims provided below. For example, in some embodiments, the grille guard member may have a first type of finish, such as a powder-coated finish, whereas the brush guard members have a second type of finish, such as a chrome finish. Additionally, although the grille guard assembly is disclosed as being comprised of metal such as steel and steel tubing, it should be appreciated that the assembly may be comprised of other materials of comparable strength.

What is claimed is:

1. An adjustable grille guard assembly operable to be installed on a vehicle to protect at least a portion of a grille of the vehicle, the adjustable grille guard assembly comprising:

a base member having a first base plate, a second base plate, and one or more support members disposed between the first base plate and the second base plate;

a first end member having a first tubed portion and a first end plate adapted to be removably affixed to the first base plate;

a second end member having a second tubed portion and a second end plate adapted to be removably affixed to the second base plate;

a first mounting member adapted to be removably affixed to at least the first base plate and the vehicle; and a second mounting member adapted to be removably affixed to at least the second base plate and the vehicle, wherein the first and second mounting members each include at least one elongated opening operable to allow the adjustable grille guard assembly to be adjusted along a horizontal axis extending from the vehicle grille to the base member, and wherein the base member includes one or more elongated openings operable to allow the base member to be adjusted along a vertical axis and along an angle relative to the horizontal axis.

2. The adjustable grille guard assembly of claim 1, wherein at least one of the one or more support members includes a substantially horizontal support member.

3. The adjustable grille guard assembly of claim 1, wherein at least one of the one or more support members includes a substantially vertical support member.

4. The adjustable grille guard assembly of claim 1, wherein the base member further comprises one or more mounting tabs disposed on at least one of the one or more support members.

5. The adjustable grille guard assembly of claim 1, wherein at least one of the base member, first end member, and second end member are comprised substantially of steel tubing.

6. The adjustable grille guard assembly of claim 1, wherein the first end member is adapted to be removably affixed to the first mounting member and includes one or more elongated openings operable to allow the first end member to be adjusted along the vertical axis and along the angle relative to the horizontal axis, and the second end member is adapted to be removably affixed to the second mounting member and includes one or more elongated openings operable to allow the second end member to be adjusted along the vertical axis and along the angle relative to the horizontal axis.

7. An adjustable grille guard assembly, comprising:
a base portion having one or more support members;
a first mounting portion coupled to the base portion and operable to attach the grille guard assembly to a vehicle; and
a second mounting portion coupled to the base portion and operable to attach the grille guard assembly to the vehicle,
wherein the first and second mounting portions each include at least one elongated opening operable to allow the adjustable grille guard assembly to be adjusted along a horizontal axis extending from a grille portion of the vehicle to the base portion, and
wherein the base portion includes one or more elongated openings operable to allow the base portion to be adjusted along a vertical axis and along an angle relative to the horizontal axis.

8. The adjustable grille guard assembly of claim 7, further comprising:
a first tubed portion coupled to a first end of the base portion; and
a second tubed portion coupled to a second end of the base portion.

9. The adjustable grille guard assembly of claim 8, wherein the base portion includes a first base plate disposed at the first end of the base portion and a second base plate disposed at the second end of the base portion.

10. The adjustable grille guard assembly of claim 9, wherein the first tubed portion is removably affixed to the first base plate disposed at the first end of the base portion, and the second tubed portion is removably affixed to the second base plate disposed at the second end of the base portion.

11. An adjustable grille guard assembly operable to be mounted on a vehicle to protect at least a front portion of the vehicle, the adjustable grille guard assembly comprising:
a base member operable to protect at least a portion of a grille portion of the front portion of the vehicle, the base member having a first base plate, a second base plate, and one or more support members disposed between the first base plate and the second base plate;
a first end member operable to protect at least a portion of a first headlight portion of the front portion of the vehicle, the first end member having a first tubed portion and a first end plate adapted to be removably affixed to the first base plate;
a second end member operable to protect at least a portion of a second headlight portion of the front portion of the vehicle, the second end member having a second tubed portion and a second end plate adapted to be removably affixed to the second base plate;
a first mounting member operable to at least partially mount at least the base member to the vehicle, the first mounting member adapted to be removably affixed to at least the first base plate; and
a second mounting member operable to at least partially mount at least the base member to the vehicle, the second mounting member adapted to be removably affixed to at least the second base plate,
wherein the first and second mounting members each include at least one elongated opening operable to allow the adjustable grille guard assembly to be adjusted along a horizontal axis extending from the front portion of the vehicle to the base member, and
wherein the base member includes one or more elongated openings operable to allow the base member to be adjusted along a vertical axis and along an angle relative to the horizontal axis.

12. The adjustable grille guard assembly of claim 11, wherein at least one of the base member, first end member, and second end member are comprised substantially of steel tubing.

13. The adjustable grille guard assembly of claim 11, wherein the first end member is adapted to be removably affixed to the first mounting member and includes one or more elongated openings operable to allow the first end member to be adjusted along the vertical axis and along the angle relative to the horizontal axis, and the second end member is adapted to be removably affixed to the second mounting member and includes one or more elongated openings operable to allow the second end member to be adjusted along the vertical axis and along the angle relative to the horizontal axis.

14. The adjustable grille guard assembly of claim 1, wherein adjusting the adjustable grille guard assembly along the horizontal axis includes adjusting the adjustable grille guard assembly from a first installed position having a first horizontal distance between the base member and the vehicle grille to a second installed position having a second horizontal distance between the base member and the vehicle grille.

15. The adjustable grille guard assembly of claim 1, wherein adjusting the base member along the vertical axis includes adjusting the base member from a first installed position having a first vertical height relative to the vehicle grille to a second installed position having a second vertical height relative to the vehicle grille.

16. The adjustable grille guard assembly of claim 1, wherein adjusting the base member along the angle relative to the horizontal axis includes adjusting the base member from a first installed position having a first angle relative to the horizontal axis to a second installed position having a second angle relative to the horizontal axis.

17. The adjustable grille guard assembly of claim 7, wherein adjusting the adjustable grille guard assembly along the horizontal axis includes adjusting the adjustable grille guard assembly from a first installed position having a first horizontal distance between the base portion and the grille portion of the vehicle to a second installed position having a second horizontal distance between the base portion and the grille portion of the vehicle.

18. The adjustable grille guard assembly of claim 7, wherein adjusting the base portion along the vertical axis includes adjusting the base portion from a first installed position having a first vertical height relative to the grille portion of the vehicle to a second installed position having a second vertical height relative to the grille portion of the vehicle.

19. The adjustable grille guard assembly of claim 7, wherein adjusting the base portion along the angle relative to the horizontal axis includes adjusting the base portion from a first installed position having a first angle relative to the horizontal axis to a second installed position having a second angle relative to the horizontal axis.

20. The adjustable grille guard assembly of claim 11, wherein adjusting the adjustable grille guard assembly along the horizontal axis includes adjusting the adjustable grille guard assembly from a first installed position having a first horizontal distance between the base member and the front portion of the vehicle to a second installed position having a second horizontal distance between the base member and the front portion of the vehicle.

21. The adjustable grille guard assembly of claim 11, wherein adjusting the base member along the vertical axis includes adjusting the base member from a first installed position having a first vertical height relative to the front portion of the vehicle to a second installed position having a second vertical height relative to the front portion of the vehicle.

22. The adjustable grille guard assembly of claim 11, wherein adjusting the base member along the angle relative to the horizontal axis includes adjusting the base member from a first installed position having a first angle relative to the horizontal axis to a second installed position having a second angle relative to the horizontal axis.

* * * * *